United States Patent [19]
O'Connor

[11] 3,754,446
[45] Aug. 28, 1973

[54] APPARATUS FOR MEASURING FLUID CHARACTERISTICS

[75] Inventor: Ward F. O'Connor, Deanville, N.J.

[73] Assignee: The Lummus Company, Bloomfield, N.J.

[22] Filed: June 3, 1970

[21] Appl. No.: 43,084

[52] U.S. Cl. .................... 73/453, 73/309, 73/313
[51] Int. Cl. ...................... G01n 9/00, G01f 23/10
[58] Field of Search .................... 73/444, 445, 451, 73/452, 453, 313, 308, 309; 340/244; 336/75, 77, 129, 115, 30

[56] References Cited
UNITED STATES PATENTS

| | | | |
|---|---|---|---|
| 1,718,494 | 6/1929 | Schurig | 336/30 |
| 2,376,156 | 5/1945 | Kuehni | 336/30 X |
| 2,558,184 | 6/1951 | Lavet | 336/30 X |
| 2,925,731 | 2/1960 | Cammack | 336/30 X |

Primary Examiner—Richard C. Queisser
Assistant Examiner—John P. Beauchamp
Attorney—Marn and Jangarathis

[57] ABSTRACT

Apparatus for indicating the characteristics of a fluid is disclosed in accordance with the teachings of the present invention wherein the fluid is permitted to pass freely within a chamber which contains a float disposed for limited vertical movement and minimal lateral deflection. Vertical movement of the float is communicated to an electrically conductive member mechanically coupled thereto. The electrically conductive member is in close proximity and magnetically coupled to a magnetization inductance coil, causing variations in the inductive properties thereof thereby affecting the magnetic field generated by energization of the coil. Inductance of the coil or generated magnetic field is measured by remote measuring devices whereby the fluid characteristics are indicated. Alternatively, the electrically conductive material may be disposed in an electric field produced by a conducting plate, thereby effecting with said conducting plate, a variable capacitance means.

8 Claims, 13 Drawing Figures

Patented Aug. 28, 1973  3,754,446

INVENTOR.
Ward F. O'Connor
BY
Marn & Jangarathis
ATTORNEYS

Patented Aug. 28, 1973 3,754,446

INVENTOR
Ward F. O'Connor
BY Marn & Jangarathis
ATTORNEYS

INVENTOR
Ward F. O'Connor
BY *Marn & Jangarathis*
ATTORNEYS 3,754,446

APPARATUS FOR MEASURING FLUID CHARACTERISTICS

This invention relates to an apparatus for measuring the density or displacement characteristics of a fluid to provide indications of such characteristics remote from the measuring element, and more particularly, to a proximity type measuring device.

In order to ascertain particular characteristics, such as the liquid density or the liquid level of a fluid body in processing equipment, it is common to provide optical measuring devices in the form of liquid level gauges wherein the liquid level or fluid density of the liquid may be determined by visual observation at a point adjacent such processing equipment. In the large processing apparatus presently used in industry, in many instances, it is impossible to make direct visual observations of the liquid level or other characteristics of the liquid at the various points in the processing equipment. Even if such points are accessible to the operators, it is much more desirable to have multiple indications of the various characteristics of the fluid passing through the processing equipment conveniently shown at one central point which is usually remote from the processing equipment itself.

In order to provide for remote indication of fluid characteristics, there have been developed various instruments including electrical means for remote signaling of the instantaneous fluid characteristics at one or more stations along the processing equipment. A conventional method for determining the specific gravity of a liquid or the liquid level of said liquid within processing apparatus is to employ a float of predetermined mass and volume which is wholly or partially submerged in the liquid whose characteristics are to be determined. The resulting force of displacement by the liquid on the float is therefore a measurement of the liquid level or specific gravity of the liquid displacing the float, and various electrical means have been provided for indicating the displacement force on the float at a point some distance from the float itself.

Therefore, it is an object of this invention to provide an improved apparatus for measuring float displacement characteristics of a fluid in which the measuring element or transducer and the displacement element may be both mounted directly in the vessel or chamber forming a portion of the process equipment thereby totally eliminating errors in measurement due to the normal remote location of the measuring element from the chamber containing the float.

It is a further object of this invention to provide an improved apparatus for measuring the displacement characteristics of a fluid in which the float is directly coupled to an electrical transducer in the form of a proximity sensing device employing magnetic coupling.

It is a further object of this invention to provide an improved apparatus of this type in which the extremely small motion of the fluid displacement element needed to effect the desired output signal permits guiding of the float with a minimum effect on accuracy.

It is a further object of this invention to provide an improved apparatus of this type in which the proximity sensing device may be easily protected from the atmosphere of the chamber carrying the fluid whose characteristics are to be measured.

It is a further object of the invention to provide a measuring system of the proximity sensing type suitable for remote electrical indication which consumes extremely small amounts of power, operates for long periods of time, is intrinsically safe electrically, may be operated in hazardous areas, and requires minimum maintenance.

Various other objects and advantages of the invention will become clear from the following detailed description of embodiments thereof, and the novel features will be particularly pointed out in connection with the appended claims.

In accordance with this invention, apparatus for remotely indicating the characteristics of a fluid is provided wherein a float is positioned within a fluid vessel, said float being disposed for one dimensional movement and having a rigid shaft mechanically coupled thereto; said shaft has an electrically conductive member mounted therealong which is magnetically coupled to a source of magnetic field; the inductive properties of the source vary as the distance between the source and electrically conductive member varies; the inductive properties are measured at a remote location and indications thereof are representative of the characteristics of the fluid. A source of electric field may be substituted for said source of magnetic field to obtain a variable capacitive means, the capacitance of which is representative of the characteristics of the fluid.

The invention will be more clearly understood by reference to the following detailed description of exemplary embodiments thereof in conjunction with the accompanying drawings in which.

Figure 1:
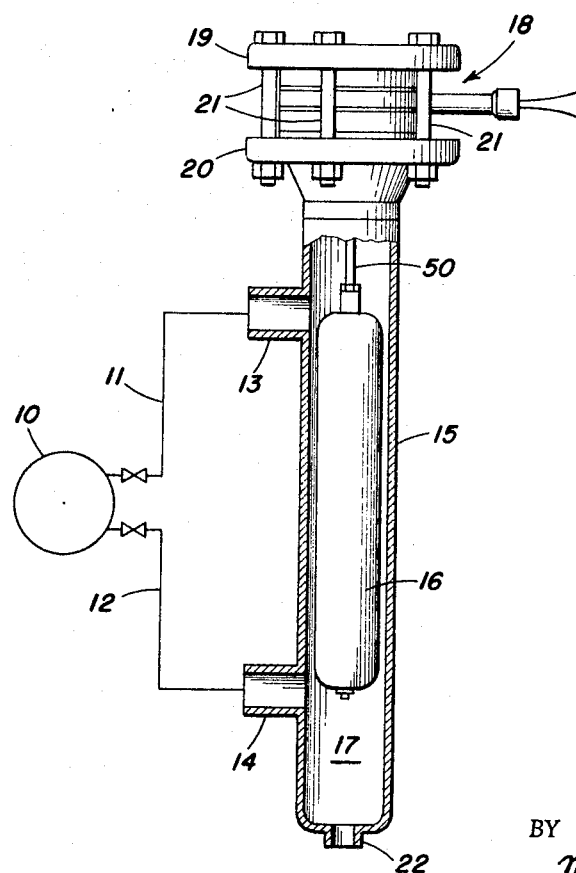
FIG. 1 is a side elevational view partially in section of one form of the apparatus of the present invention, and schematically illustrates the apparatus operatively connected to a processing vessel for liquid phase measurement.

Referring to the drawings wherein like references numerals are used throughout, there is schematically shown in FIG. 1 a relatively large fluid vessel 10 which may form a part of a processing complex wherein it is desirous to provide some remote indication of the fluid characteristics of a fluid body within the vessel 10.

The present invention is directed to the provision of a measuring device or apparatus which is in fluid communication with the body of fluid in vessel 10 through lines 11 and 12. The measuring device is provided with the electrical transducer therein for producing an electrical signal indicative of the fluid characteristics of the main body of fluid in the vessel 10. The measuring apparatus includes an elongated cylindrical housing 15 of generally thin walled construction and having a pair of spaced lateral side ports 13 and 14 and/or a bottom port 22 as is conventional in the art. The fluid freely circulates within chamber 17 formed within the cylindrical container 15 and is in contact with an elongated cylindrical float or displacer 16.

In practice, the float 16 may be made from commercially available tubing of standard diameter and length as to displace approximately 1 to 2 pounds of water. The float may be weighted to a density of approximately 1.1 although it is obvious that other float displacements and densities may be employed therein.

Figure 2:
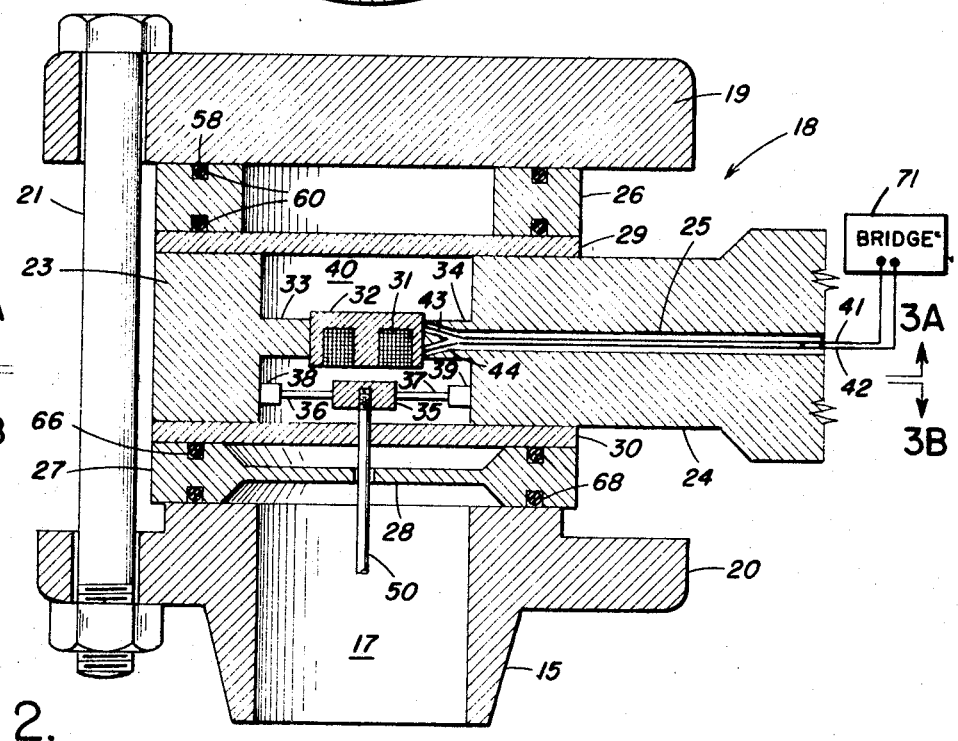
FIG. 2 is an enlarged side elevational view of a portion of the apparatus of FIG. 1, in section, showing in detail one embodiment of the transducer portions of the apparatus.

It is readily seen that cylindrical housing or casing 15 may act as a vertical guide for float 16 thereby substantially restricting any lateral movement but allowing for vertical or upward and downward forces on the float 16 within chamber 17 as a result of the displacement of float 16 within the body of fluid in the chamber 17. It is to be noted that the float displacement apparatus of the present invention is physically coupled to and positioned in sealed relationship with the cylindrical housing 15. The upper portion of the cylindrical housing 15 is provided with a radial flange 20 as indicated in FIG. 2 through which is drilled a plurality of holes. An electrical transducer or measuring device comprising an assembly, generally indicated as 18, is positioned between the flange 20 and a cover 19 which may be formed of like material as cylindrical housing 15. The cover 19 has a plurality of holes in similar radial disposition as the holes in the flange 20, such holes being adapted to receive bolts, generally indicated as 21.

The assembly 18 is positioned between the cover 19 and the flange portion 20 of the cylindrical housing 15 in sealed relation thereto. In this regard, the assembly is comprised of upper and lower annular members or elements 26 and 27 which act to sandwich an intermediate annular member 23 therebetween. It is of course understood that the three annular members 23, 26 and 27 are clamped together and suitably held in position by a plurality of fasteners which may comprise, among others, threaded bolts. As illustrated in FIG. 2, these elements are in assembled position.

Annular slots 58 are provided on each side of the element 26 to receive suitable O-rings or like sealing members 60 for providing a fluid tight seal between the elements forming the assembly 18. The lower annular element 27 has a center section of reduced cross section 28 having a central opening and includes annular slots 66 formed on each side thereof radially outward of the reduced cross-sectional portion 28 for receiving sealing elements such as O-rings 68 to provide a fluid tight seal.

The central annular element 23 is rigid and is positioned between the flange 20 and cover 19 by the annular members 26 and 27 and is sealed by the use of the sealing elements such as O-rings 60 and 68 to comprise a further cylindrical housing as illustrated. A relatively large central opening is provided within the annular member 23. A pair of relatively thin resilient diaphragms 29 and 30 are clamped at their outer ends between the central annular member 23 and the annular members 26 and 27 as illustrated in FIG. 2, and with the central opening provided within annular member 23 form the cavity 40 within which the transducer is positioned. The resilient diaphragms 29 and 30 may be formed of metal, plastic, fabric or other such material, as is consistent with the proper operation of the transducer.

Within the cavity 40 is a disc-shaped member 35, preferably formed of an electrically conductive material, integrally coupled to shaft 50. Member 35 may be of ferromagnetic or nonferromagnetic material, as will soon be seen, and may include a threaded recess adaped to receive a complementary threaded portion of shaft 50, thereby forming a mechanical fastening. It is seen that member 35 is connected to radial bosses 38 and 39 by flexure means 36 and 37. The radial bosses 38 and 39 may be unitary portions of the vertical wall of the central opening of central annular member 23. The flexure means 36 and 37 are capable of limiting the longitudinal movement of member 35 connected thereto. The composition of the flexure means 36 and 37 are well known in the art, and the shape assumed by said flexure means 36 and 37 may be that of a plurality of beams, a single beam capable of incorporating member 35, a disc including member 35 as a central portion thereof, or the like. Thus, it is apparent that a longitudinal force communicated to member 35 by shaft 50 will result in limited longitudinal displacement of member 35 because of the opposing forces applied to member 35 by flexure means 36 and 37.

Shaft 50 is affixed to the float 16, as indicated in FIG. 1. Although not shown, the shaft 50 may include a socket adapted to receive a ball member, which ball member may be an extremity of a connecting rod thereby allowing for a slight pivoting movement between float 16 which may be coupled to said connecting rod, and the rigidly held shaft 50. Other shapes may be employed. It is apparent therefore that longitudinal or axial movement of float 16 within cylindrical housing 15, as a result of fluid displacement, results in axial movement of member 35. It should be understood that the shape of member 35 is not strictly limited to a disc, but that the member may be formed of any shape which is compatible with the cavity 40 and flexure means 36 and 37.

Further included in the cavity 40 is magnetization inductance coil 31 wound about a conventional core 32. The core 32 is mechanically supported by radial bosses 33 and 34 which may be coupled to the vertical wall of the central opening of central annular member 23, or the radial bosses 33 and 34 may be integral portions of annular member 23, extending into the central opening thereof. Alternative supports may be employed as will subsequently be described. As is well known, magnetization inductance coil 31 is a reactive electrical component exhibiting inductive properties and generating a magnetic field when supplied with an alternating current. In order to connect magnetization inductance coil 31 to a source of alternating current there is provided within the annular member 23 a central bore 25 which is included within extended portion 24 of the annular member 23 and terminates short of the central opening. A pair of diagonal, relatively thin connecting ports 43 and 44 allow thin electrical wires 41 and 42, which constitute the leads to the magnetization inductance coil 31, to be inserted in the central bore 25 and extend through the respective inclined bores 43 and 44 to the cavity 40 for connection to magnetization inductance coil 31. The electrical transducer elements in the form of member 35 and magnetization inductance coil 31 are protected from the environment within chamber 17 through the use of the upper and lower diaphragms 29 and 30. The electrical leads 41 and 42 are coupled to conventional remote indicators (not shown) and utilize small electrical currents or voltages. If desired, a liquid or gaseous sealant may occupy the cavity 40 to isolate the transducer from ambient influences.

The operation of proximity measuring devices is quite conventional and will be briefly described with respect to the transducer illustrated in FIG. 2. As is well known in the inductance coil art, the inductance of an energized coil is dependent upon the proximity of electrically conductive material thereto. Accordingly, movement of electrically conductive material through a magnetic field generated by an energized coil varies the inductance of the coil by altering the generated magnetic field. Thus, if the inductance of the coil or if the generated magnetic field can be measured, the relative proximity of electrically conductive material may be deduced. It is apparent that as a result of variation in fluid density of the body of liquid within chamber 17, or as a result of liquid level change if the device is used as an indication of liquid level, the force of displacement on the float 16 is transferred through shaft 50, to member 35 which results in a slight upward or downward movement of member 35. As aforedescribed, movement of member 35 is limited by flexure means 36 and 37. As a result, the inductance of magnetization inductance coil 31 varies as the reluctance between the coil and member 35 changes. Correspondingly, the magnetic field generated by magnetization inductance coil 31 also varies. The inductance of coil 31 may be measured by well known instruments such as a Maxwell bridge, an Owen type bridge circuit or other conventional apparatus 71 to which leads 41 and 42 are connected. Flexure means 36 and 37 prevent extreme changes in the inductance of coil 31, thereby admitting of highly sensitive and accurate impedance measuring means to determine said inductance. It should be clear than an indication of inductance is also an indication of the generated magnetic field and, alternatively, apparatus that measures the magnetic field may be utilized to indicate a change in inductance. In either event, the measuring devices may be appropriately calibrated to directly indicate the fluid characteristics which cause the float 16 to be vertically displaced, thereby altering the separation between member 35 and magnetization inductance coil 31.

It is well understood that when magnetization inductance coil 31 is energized by an alternating current, preferably of a high frequency, eddy currents are induced in electrically conductive member 35. The magnitude of the induced eddy currents is proportional to the distance between coil 31 and member 35. The eddy currents produce a magnetic field which opposes the magnetic field generated by coil 31, resulting in a decreased effective magnetic field and causing the impedance of the coil 31 to change in a corresponding manner. If member 35 is of a nonferromagnetic material, the change in the impedance of coil 31 is mainly resistive. If, however, member 35 is comprised of a ferromagnetic material, the change in the impedance of coil 31 is mainly inductive. Hence, the choice of impedance measuring instrument employed to determine the proximity of member 35 to coil 31 is dependent upon the composition of electrically conductive member 35.

The distance from the top of the float or the center line of fluid port 13 and the magnetization inductance coil 31 may be varied to provide a radiating section above the top process connection to the float, if the float 16 is used in a system indicating a liquid level somewhere intermediate of fluid ports 13 and 14. The technique of positioning the measuring element, that is, the transducer, above the fluid displaced float member 16 provides a space for the collection of vapor, the low rate of heat transfer of the vapors provides temperature overrange protection to the transducer or measuring element for continuous operation on services where the fluid temperatures are well above or below the desired temperature of the measuring element. This technique also reduces temperature errors, thermal stresses and acts to extend the operating life of the device even though the device is advantageously associated directly with the main body of liquid in the processing equipment.

While the measuring element and its displacer are mounted directly in a vessel or chamber associated with the liquid processing equipment, it may also be connected to the processing equipment in the manner of a displaced conventional float chamber through conventional liquid connecting conduits and provide all of the same benefits as that of the first embodiment shown in FIGS. 1 and 2. The use of the flexible diaphragms 29 and 30 to seal the member 35 and magnetization inductance coil 31 within cavity 40 is only one method by which isolation of the transducer may be accomplished. Obviously, any conventional method of sealing a measuring element from exposure to vapors or liquids may be utilized as well as for providing temperature overrange protection to the element.

The present device is designed to operate under a very wide range of temperatures and pressure conditions and the illustrated embodiment operates satisfactorily at temperatures between about $-100°$ F. to about $800°$ F., and at pressures up to 5,000 psig. One aspect of the present invention is the symmetrical positioning of magnetization inductance coil 31 and member 35, and the support of these elements concentrically of the float whereby a small deflection of the float results in a highly accurate output signal for delivery from the coil 31 to the remote indicator (not shown).

Figure 3B:
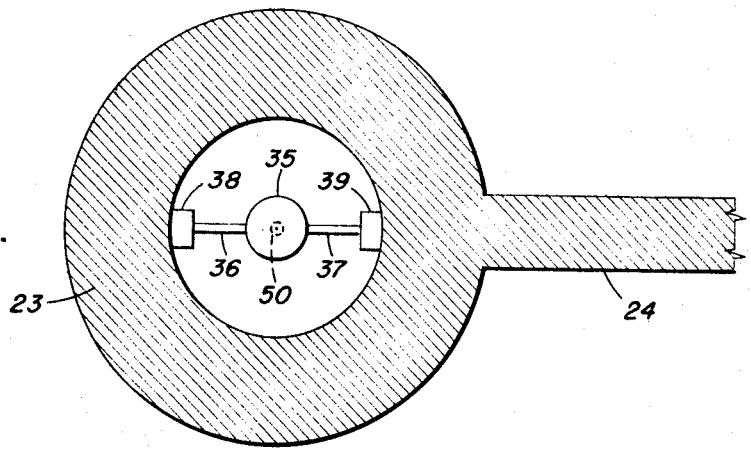
FIGS. 3A and 3B are sectional views of the portions taken along lines 3A—3A and 3B—3B, respectively of the embodiment shown in FIG. 2.
Figure 3A:
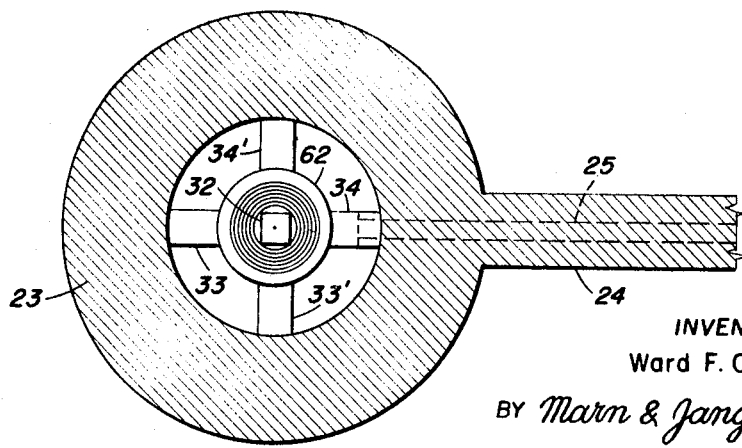

A sectional view of cavity 40 taken along lines 3A—3A of FIG. 2 may be seen in FIG. 3A. Four radial bosses 33, 33', 34 and 34' support core 32 which is concentric with float 16. It is understood that the number of radial bosses utilized to support core 32 is not limited to four. Core 32 may be a conventional E core comprised of a plurality of laminations of highly permeable iron or steel alloy. Coil 31 is wound about the center leg of the E core, and the magnetization coil thus formed is encapsulated in an epoxy molding compound 62 for protection from the environment. The conducting leads of the encapsulated magnetization inductance coil extend through central bore 25 and the connecting ports included within radial boss 34, as described hereinabove.

FIG. 3B illustrates a top view of member 35 taken along lines 3B—3B of FIG. 2. Member 35 is illustrated as disc-shaped, however, it is understood that member 35 may assume any shape compatible with the magnetization inductance coil, the flexure means 36 and 37 and the cavity 40. Further, the surface area of member 35 must be adequate to provide a measurable change in the impedance of the magnetization inductance coil as the distance therebetween varies. It is well known to those skilled in the art that the surface conductivity as well as surface area of member 35 affects the sensitivity of the magnetization inductance coil to changes in the resultant magnetic field. Accordingly, a deposit of a film of nonpermeable conductive material on the surface of member 35 will improve the sensitivity of the coil. The flexure means 36 and 37 that support member 35 in cavity 40, concentric with float 16 and the magnetization inductance coil, are illustrated as relatively thin rectangular beams. In addition to the aforedescribed alternative configurations of flexure means 36 and 37, the forth-coming description will explain in detail a preferred embodiment thereof. The radial bosses 38 and 39 may be replaced by equivalent mechanical coupling means whereby flexure means 36 and 37 are supported within cavity 40.

Figure 4:
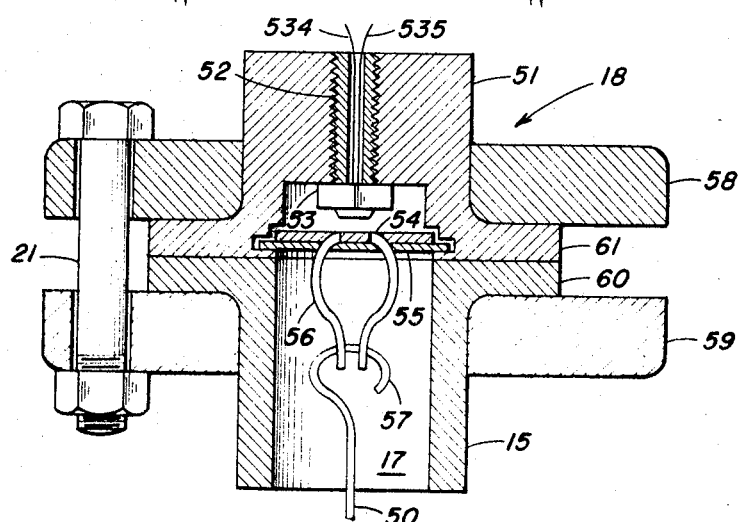
FIG. 4 is a side elevational view, in section, of a second embodiment of the present invention.

A second embodiment of the present invention is illustrated in FIG. 4 and comprises cylindrical housing 15 provided with a radial flange 60, cylindrical housing 51 provided with a radial flange 61, annular members 58 and 59, magnetization inductance coil 53, electrically conductive member 54, yoke 56 and shaft 50. Annular members 58 and 59 are provided with a plurality of radially disposed holes adapted to receive bolts 21. Annular members 58 and 59 serve to clamp cylindrical housings 15 and 51 as shown in FIG. 4 such that radial flanges 60 and 61 are in sealing relationship. A central bore of cylindrical housing 51 terminates in a chamber concentric with chamber 17. The lower portion of said central bore may include a threaded section to receive a bolt 52. Nut-like housing 53 may be affixed to bolt 52 and includes the magnetization inductance coil. Connecting leads 534 and 535 extend through a central channel of bolt 52 to couple the magnetization inductance coil included in housing 53 to a source of alternating current.

Electrically conductive member 54 is supported by rigid support means 55 and is coupled to yoke 56. It will soon be seen that electrically conductive member 54 and yoke 56 may be of unitary construction. The electrically conductive member 54 may be of a mechanically flexible nature, equivalent to the flexure means aforedescribed. Shaft 50, coupled to float 16, may include an arcuate hook-like structure 57 at one end thereof. Said arcuate hook-like structure 57 is adapted to be inserted through an aperture included in the lower section of yoke 56, subsequently described. Rigid support means 55 may be inserted in circumferential slots formed in the inner wall of cylindrical housing 51. Accordingly, displacement of float 16 is communicated as a force to electrically conductive member 54 by shaft 50, resulting in slight longitudinal movement of the flexible electrically conductive member 54. However, the position of rigid support means 55 remains fixed within the circumferential slots of cylindrical housing 51. It is apparent that circumferential slots might be provided on opposite horizontal surfaces of flanges 60 and 61 within which rigid support means 55 may be inserted. This would facilitate assembly of the structure of FIG. 4.

Figure 5A:
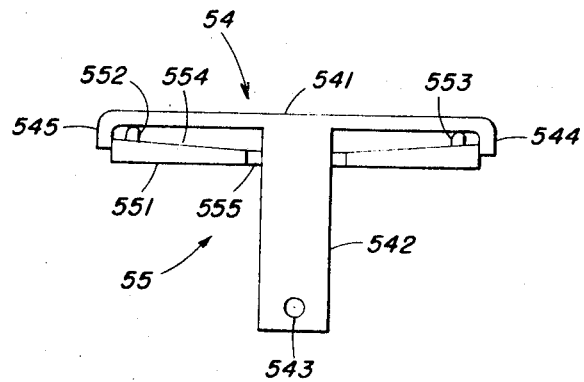
FIGS. 5A–5C illustrate portions of the apparatus shown in FIG. 4.
Figure 5B:
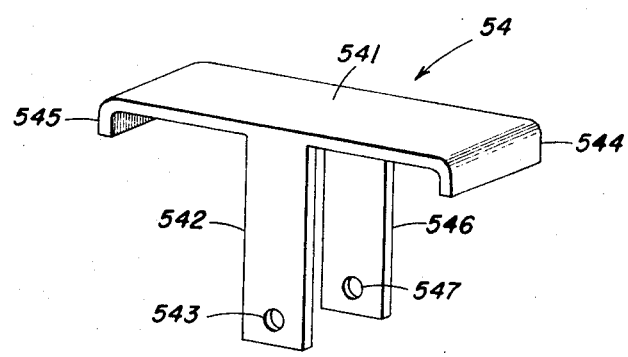
Figure 5C:
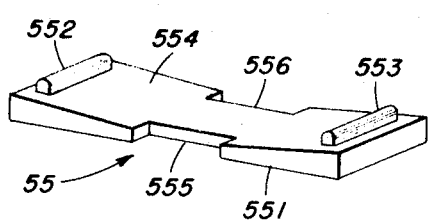

Referring now to FIG. 5A there is shown a more detailed diagram of flexible electrically conductive member 54 and a rigid support means 55. The flexible electrically conductive member 54 is a T-shaped element including cross piece 541 and, as shown in FIG. 5B, a pair of depending rectangular members 542 and 546. The depending rectangular members 542 and 546 may comprise aforementioned yoke 56 and are provided with apertures 543 and 547, respectively, through which arcuate hook 57 may be inserted. Cross piece 541 terminates in flanges 544 and 545, respectively, at each extremity thereof. Flanges 544 and 545 embrace the end portions of rigid support means 55 as seen from FIG. 5A to constrain lateral movement of flexible electrically conductive member 54. Cross piece 541 seats upon protuberances 552 and 553 disposed upon the upper surface of rigid support means 55. The protuberances, or spacers, 552 and 553 may be continuously formed of the same material as rigid support means 55 or may be fixedly mounted thereon as illustrated in FIG. 5C.

Rigid support means 55 is of rectangular shape and is formed of relatively inelastic material. The upper surface 554 of rigid support means 55 is inclined slightly with respect to the lower horizontal surface 551 such that the left hand portion of upper surface 554 is of negative slope and the right hand portion of upper surface 554 is of positive slope. A pair of rectangular recesses 555 and 556 are formed in the central section of rigid support means 55 to accommodate depending rectangular members 542 and 546 as shown in FIG. 5A. The separation between rectangular members 542 and 546 is sufficient to inhibit reciprocal motion of T-shaped flexible electrically conductive member 54 when the latter member is seated upon protuberances 552 and 553. It is apparent that if a downward force is applied to depending rectangular members 542 and 546, such as the force exerted thereon by shaft 50, cross piece 541 is subject to a vertical deflection. Protuberances 552 and 553 supply an upward force equal and opposite to the just mentioned downward force, thereby supplying a bending moment to cross piece 541 which is effective to produce said vertical deflection. Hence, the distance between the electrically conductive member 54 and the magnetization inductance coil varies. Consequently, the impedance of the magnetization inductance coil is proportionally altered. The aforedescribed circumferential slots formed in the inner wall of cylindrical housing 51 prevents vertical displacement of rigid support means 55. Accordingly, an upward vertical force applied to depending rectangular members 542 and 546 by shaft 50 combines with a resulting downward vertical force applied to cross piece 541 by said circumferential slots to produce a bending moment effective to produce an upward vertical deflection of electrically conductive member 54.

It is clear from the foregoing that upper surface 554 of rigid support means 55 need not be inclined if protuberances 552 and 553 are properly chosen. However, a greater range of vertical deflection is obtained if the illustrated configuration is employed. It is also recognized that cross piece 541 and rigid support means 55 are not limited to rectangular shapes but may assume any geometric shape, such as circular, compatible with cylindrical housing 51. Also, rectangular recesses 555 and 556 may be replaced by rectangular slots adapted to receive depending rectangular members 542 and 546.

Figure 6A:
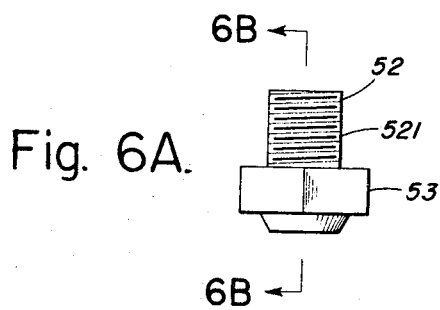
FIGS. 6A–6B are enlarged views of the transducer shown in FIG. 4.
Figure 6B:
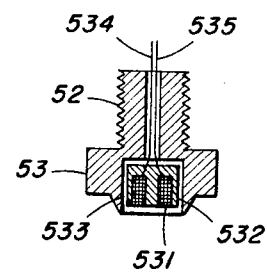

FIG. 6A illustrates magnetization inductance coil housing 53 mounted on bolt 52. The bolt 52 is provided with screw threads 521 and, accordingly, housing 53 may include a depression having complementary threads whereby housing 53 may be attached to bolt 52. Alternatively, bolt 52 and housing 53 may be of unitary construction, formed of the same material. In either case, a sectional view of bolt 52 and affixed housing 53, taken along lines 6B—6B, is set forth in FIG. 6B. Bolt 52 includes a central bore that terminates in chamber 533 of housing 53. Situated within chamber 533 is magnetization inductance coil 531 wound about conventional core 532. Core 532 may be a conventional E core comprised of a plurality of laminations of highly permeable iron or steel alloy, and coil 531 may be wound about the center leg of the E core. The magnetization inductance coil thus formed may be encapsulated in a conventional epoxy resin. Connecting leads 534 and 535 extend through the central bore of bolt 52 and are adapted to couple coil 531 to a source of alternating current. It is understood that the specific shape of housing 53 is not, per se, of critical importance to the present invention. Housing 53 may assume any desired shape. Indeed, housing 53 is not required if chamber 533, or the like, is included in bolt 52. The magnetic field produced by magnetization inductance coil 531 must be sufficient to induce eddy currents in electrically conductive member 54. Consequently, chamber 533 is not sealed at its lower portion by electrically conductive material, or by highly permeable material.

If desired, magnetization inductance coil 531 included in chamber 533 of housing 53 and flexible member 55 may be isolated from the ambience by a liquid sealant in the manner described hereinabove with respect to FIG. 2.

Figure 7:
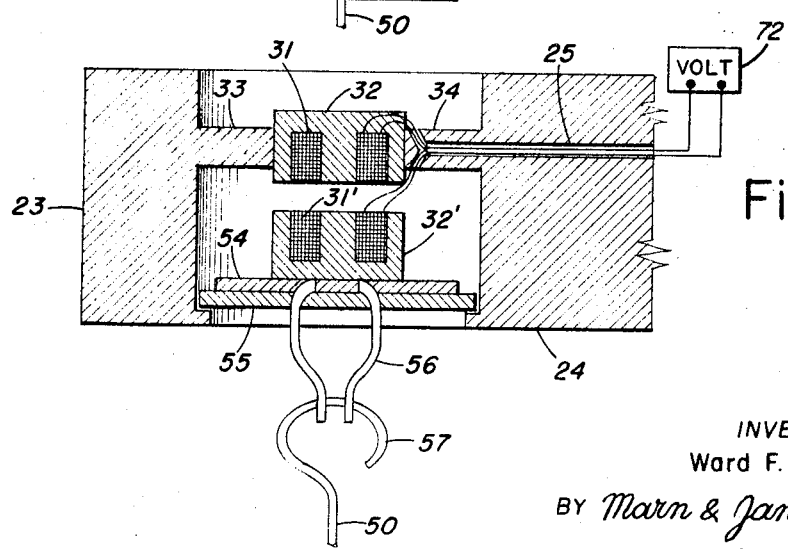
FIG. 7 is a side elevational view, in section, of a third embodiment of the present invention.

Another embodiment of the present invention is depicted in FIG. 7 which comprises magnetization inductance coil 31, flexible member 54, rigid support means 55, shaft 50 and coil 31'. The magnetization inductance coil 31 is wound about core 32 which may be a conventional E core, described hereinabove. Coil 31 and 32 may be encapsulated in an epoxy molding compound and the encapsulated magnetization inductance coil is supported concentrically with float 16. It is understood that the mechanical supports for the encapsulated magnetization inductance coil 31 may comprise radial bosses 33 and 34 coupled to the inner wall of the central annular member 23 of FIG. 2. Or, if desired, the encapsulated magnetization inductance coil 31 may be mounted in housing 53 affixed to bolt 52 as illustrated in FIG. 4.

Flexible member 54 may comprise the T-shaped element described with respect to FIG. 5B, which is supported by rigid support means 55, described with respect to FIG. 5C. Shaft 50 is coupled at one end to float 16 as is now appreciated. The other end of shaft 50 terminates in an arcuate hook-like member 57 that is adapted to be received by apertures provided in yoke 56. In the embodiment shown in FIG. 7, flexible member 54 need not be formed of electrically conductive material, as will soon become apparent. Flexible member 54 has mounted thereon coil 31' wound about core 32'. Coil 31' and core 32' may be similar to coil 31 and core 32, respectively. Accordingly, coil 31' and core 32' may be encapsulated in an epoxy molding compound. If desired, flexure means 36 and 37 may be substituted for flexible member 54, thereby obviating the need for rigid support means 55, and coil 31' may be mounted on, or substituted for member 35.

The operation of the apparatus of FIG. 7 will now be described. When magnetization inductance coil 31 is supplied with a source of alternating current, a magnetic field is generated thereby. Magnetic flux produced by magnetization inductance coil 31 links coil 31'. Since magnetization inductance coil 31 is supplied with an alternating current, a changing magnetic flux links coil 31' and an electromotive force is induced in the latter coil 31'. It is recognized by one skilled in the art that the magnitude of the induced electromotive force, or voltage potential, is dependent upon the reluctance between core 32 and core 32'; and said reluctance is determined by the separation therebetween. Consequently, a measurement of the voltage induced in coil 31' is proportional to the proximity between coil 31 and 31'. Since the displacement of coil 31' is proportional to the relative position of float 16, it is readily apparent that a measurement of the voltage induced in coil 31' is a representation of the displacement of float 16. If desired, the voltage measuring device 72 coupled to coil 31' may be appropriately calibrated to directly indicate the fluid characteristics which cause float 16 to be displaced.

The voltage induced in coil 31' is capable of causing a current to flow therein. This current produces a magnetic field which has a similar effect as the aforedescribed magnetic field produced by the eddy currents induced in the electrically conductive member 35 of FIG. 2. More particularly, the magnetic field produced by coil 31' opposes the magnetic field generated by magnetization inductance coil 31, resulting in a decreased effective magnetic field and causing the impedance of the coil 31 to change in a corresponding manner. The magnitude of the magnetic field produced by coil 31' is proportional to the reluctance between coils 31 and 31'. Hence, the force of longitudinal displacement of float 16 is transferred through shaft 50 to flexible member 54 which causes a slight upward or downward movement of coil 31' thereby varying the inductance of magnetization inductance coil 31 as the reluctance between coils 31 and 31' varies. The inductance of coil 31 may be measured as described hereinabove ith reference to FIG. 2. If coils 31 and 31' are connected in series relationship, the total inductance of said series connected coils is equal to the self inductance of each coil plus the mutual inductance therebetween. Since the mutual inductance is dependent upon the reluctance between coils 31 and 31', it is seen, from the foregoing explanation, that the force of displacement of float 16 is indicated by a change in the mutual inductance of the series connected coils 31 and 31'. Hence, a measurement of the total inductance of said series connected coils is an indication of the fluid characteristics.

It is apparent that coils 31 and 31' may be positioned in a chamber formed by a pair of resilient diaphragms similar to 29 and 30 of FIG. 2. The chamber may be filled with a liquid sealant to protect coils 31 and 31' from the ambience.

Figure 8:
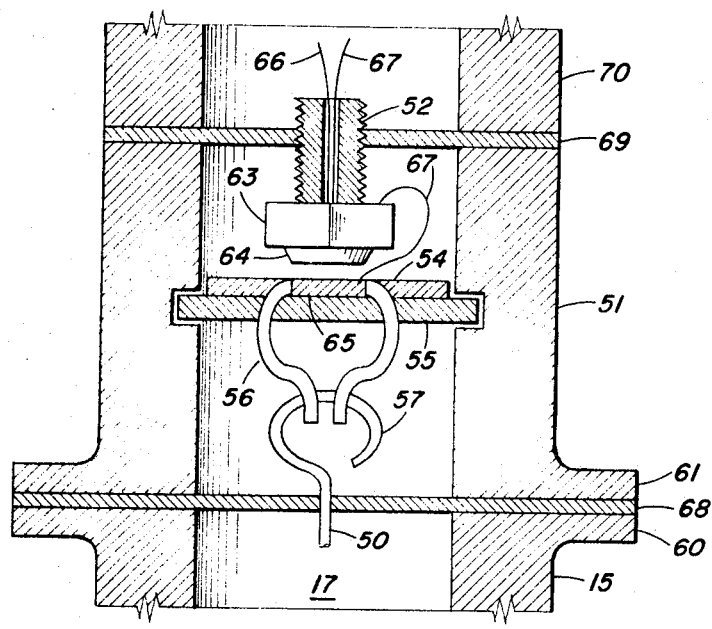
FIG. 8 is a side elevational view, in section, of a fourth embodiment of the present invention.

One skilled in the art will recognize that the apparatus heretofore described admits of representing the displacement force on float 16 in terms of impedance of a conventional electric circuit element, thereby indicating the characteristics of a fluid within which said float is immersed. The electric circuit element has been characterized as a magnetization inductance coil capable of producing a magnetic field, and having a variable inductance. It is evident that analogous electric circuit elements may be utilized, in accordance with the teachings of the present invention, such as a parallel plate capacitor capable of producing an electric field, and having a variable capacitance. FIG. 8 is an illustrative embodiment of fluid characteristic measuring apparatus employing variable capacitance and comprises housing 63, flexible member 54, rigid support means 55 and shaft 50. Housing 63 is affixed to bolt 52 in the manner described with regard to FIG. 4. Accordingly, bolt 52 is provided with a central channel adapted to receive conducting leads 66 and 67 which are supplied with an energization voltage. Housing 63 may include one plate of a parallel plate capacitor to which lead 66 is coupled. Said one plate is disposed in a horizontal plane perpendicular to shaft 50. If desired, bevelled portion 64 of housing 63 may comprise said one plate and, therefore, may be formed of electrically conductive material.

Flexible member 54 may comprise the T-shaped element described with respect to FIG. 5B, which is supported by rigid support means 55, described with respect to FIG. 5C. Shaft 50, coupled at one end to float 16, terminates in an arcuate hook means 57 that may be introduced into apertures provided in yoke 56. The flexible member 54 comprises the second plate of a parallel plate capacitor and may be formed of electrically conductive material. If desired, a film of electrically conductive material may be deposited on the upper surface of flexible member 54 is said flexible member is not electrically conductive. The second plate is coupled to conducting lead 67. It is recognized that only the portion 65 of flexible member 54 that is opposite said one plate need be formed of electrically conductive material. Flexible member 54 and rigid support means 55 may be replaced by flexure means 36 and 37, and, accordingly, member 35 may comprise the second plate of a parallel plate capacitor.

For purposes of explanation, it will be assumed that bevelled tip 64 of housing 63 and shaded portion 65 of flexible member 54 comprise the two parallel plates of a parallel plate capacitor. It is understood that the capacitance of this parallel plate capacitor is determined by the surface area of the bevelled tip 64 and shaded portion 65, the distance between bevelled tip 64 and shaded portion 65 and the dielectric constant of the medium therebetween. Consequently, if one or more of these factors are varied, the capacitance is varied. The force of displacement of float 16 causes a slight upward or downward movement of flexible member 54 thereby varying the distance between the two parallel plates of the parallel plate capacitor. Hence, the fluid characteristics may be ascertained by measuring the capacitance of this parallel plate capacitor. Devices that may be employed to measure capacitance are well known in the prior art and need not be described here.

A liquid or gaseous dielectric may be provided to increase the capacitance of the parallel plate capacitor (thereby improving the sensitivity thereof to changes in the capacitance caused by movement of flexible member 54) and to isolate the parallel plate capacitor from the ambience. A first resilient diaphragm 68, similar to aforementioned diaphragm 30, may be clamped at the outer periphery thereof between flanges 60 and 61 of cylindrical housings 15 and 51, respectively. A second resilient diaphragm 69 may be clamped at the outer periphery thereof between cylindrical housings 51 and 70 as illustrated in FIG. 8. The chamber thus formed between diaphragms 68 and 69 may be filled with a conventional liquid sealant of high dielectric coefficient.

Figure 9:
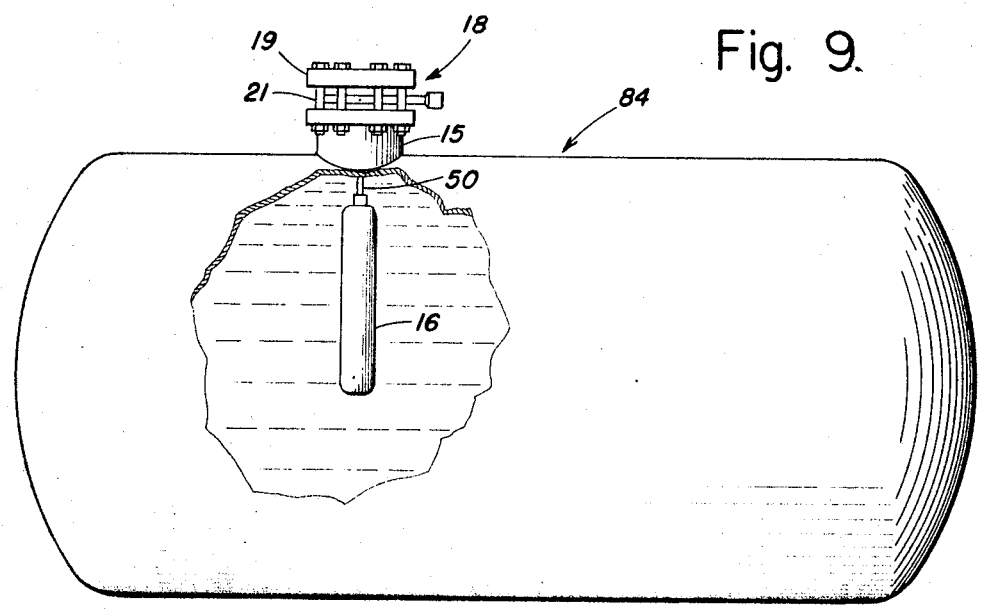
FIG. 9 is a side elevational view partly in section and partly schematic, illustrating the manner in which the apparatus may be positioned within a vessel for level or density measurements.

The embodiment shown in FIG. 9 illustrates the manner in which the concept of the present invention may be employed within a processing vessel to measure the characteristics of a fluid therein, particularly the liquid level and density thereof. Accordingly, only the float 16 is supported by shaft 50 within the vessel 84. The shaft 50 may be connected to the measuring device 18 in the manner shown in FIGS. 2, 4, 7 or 8. It is understood that measuring device 18 may comprise any of the embodiments of the present invention set forth hereinabove.

It should now be apparent that the very small deflection of the float 16 permits guiding of the float with a very minimum effect on accuracy. Not only does this increase flexibility in design, but also permits installation in turbulent or disturbed areas without appreciable effects upon the accuracy of the instrument, and unlike prior art systems there is no need to provide the measuring device within plumb piping or chambers. It is to be noted in the various embodiments of the present invention, that flexure means 36 and 37 and flexible member 54 are provided for permitting only slight displacement of the electrically conductive material. Accordingly, greater sensitivity and higher accuracy is obtained by the present invention than heretofore known.

It is apparent therefore that, by the present invention, means for measuring the force of the displacement of a float suspended in a medium, the level of the medium or its density or both may be easily determined. The fluid may be a liquid or a gas. The device may be used for analogue or spot measurements as required. The electrical signal indicative of the level or density of the medium may be used for all forms of measurement, automation and control. While the prior art designs of the electrical type were such that they required the measuring device to be external to the vessel or process conditions, the necessity for transferring the displacement force to an external detector is eliminated by the present apparatus and any errors resulting from transferring the displacement force are eliminated by the apparatus of the present invention.

While this invention has been particularly shown and described with reference to specific embodiments thereof, it will be obvious to those skilled in the art that the foregoing and various other changes and modifications in form and details may be made without departing from the spirit and scope of the invention. It is therefore, intended that the appended claims be interpreted as including all such changes and modifications.

What is claimed is:

1. In combination with apparatus for remotely indicating the characteristics of a fluid, said apparatus including a float positioned within a chamber and disposed for limited axial movement and minimal lateral deflection in accordance with the buoyant force exerted by the fluid in said chamber, the improvement comprising:

an annular member positioned concentric of said float and disposed externally of said chamber, said annular member including a central opening and having a plurality of radial bosses extending into said opening from the inner wall of said annular member;

core means supported by said bosses and having wound thereon a magnetization inductance coil, said magnetization inductance coil being adapted to be electrically connected to a source of alternating current for generating a magnetic field;

rigid support means positioned externally of said chamber and disposed in proximate relation to said magnetization inductance coil;

a flexible member comprised of electrically conductive material coupled to said rigid support means and adapted for limited displacement with respect to said rigid support means to thereby vary the effective inductance of said magnetization inductance coil;

a shaft having a first end mechanically coupled to said float and a second end mechanically coupled to said flexible member for imparting said limited displacement to said flexible member in response to said buoyant forces; and means coupled to said magnetization inductance coil and remote therefrom for measuring said magnetic field to thereby indicate said fluid characteristics.

2. In combination with apparatus for remotely indicating the characteristics of a fluid, said apparatus including a float positioned within a chamber and disposed for limited axial movement and minimal lateral deflection in accordance with the buoyant force exerted by the fluid in said chamber, the improvement comprising:

inductance means including a magnetization inductance coil positioned externally of said chamber, said magnetization inductance coil being adapted to be electrically connected to a source of alternating current for generating a magnetic field;

rigid support means positioned externally of said chamber and disposed in proximate relation to said magnetization inductance coil, said rigid support means comprising a beam inserted in circumferential slots formed in the inner wall of a cylindrical housing positioned concentric of said float;

a flexible member comprised of electrically conductive material seated upon said beam and adapted for limited displacement with respect to said beam to thereby vary the effective inductance of said magnetization inductance coil;

a shaft having a first end mechanically coupled to said float and a second end mechanically coupled to said flexible member for imparting said limited displacement to said flexible member in response to said buoyant forces; and means coupled to said magnetization inductance coil and remote therefrom for measuring said magnetic field to thereby indicate said fluid characteristics.

3. The improvement of claim 2 wherein said means for measuring said magnetic field comprises impedance bridge means for computing the inductance of said magnetization inductance coil as the reluctance between said flexible member and said magnetization inductance coil varies.

4. The improvement of claim 2 wherein said inductance means comprises:

a cylindrical housing positioned concentric of said float and including a chamber;

magnetization inductance coil housing means positioned in said chamber of said cylindrical housing; and core means disposed within said magnetization inductance coil housing means and having wound thereon said magnetization inductance coil.

5. The improvement of claim 2 wherein said flexible member is comprised of ferromagnetic material.

6. The improvement of claim 2 wherein said flexible member comprises a cross piece of electrically conductive material seated upon said protuberances and having legs depending from said cross piece and mechanically coupled to said shaft.

7. The improvement of claim 2 wherein said beam includes protuberances disposed upon the upper surface thereof and upon which is seated said flexible member.

8. Apparatus for remotely indicating the characteristics of a fluid within a vessel, comprising:

float means positioned within said vessel and responsive to said fluid characteristics for producing corresponding forces of displacement a first magnetization inductance coil fixedly positioned externally of said vessel and adapted to be electrically supplied with an alternating current;

flexible support means positioned externally of said vessel means for communicating said forces of displacement to said flexible support means whereby said flexible support means is subject to limited deflection in accordance with said forces of displacement;

a second magnetization inductance coil supported by said flexible support means in close proximity to said first magnetization inductance coil such that a voltage potential is induced across said second magnetization inductance coil in response to a magnetic field generated by said first magnetization inductance coil; and voltage measuring means remote from and coupled to said second magnetization inductance coil for measuring said induced voltage potential.

* * * * *